Jan. 5, 1937.   G. E. HOWARD   2,067,142
APPARATUS FOR AND METHOD OF DELIVERING MOLTEN GLASS
Filed Oct. 18, 1934   6 Sheets-Sheet 1
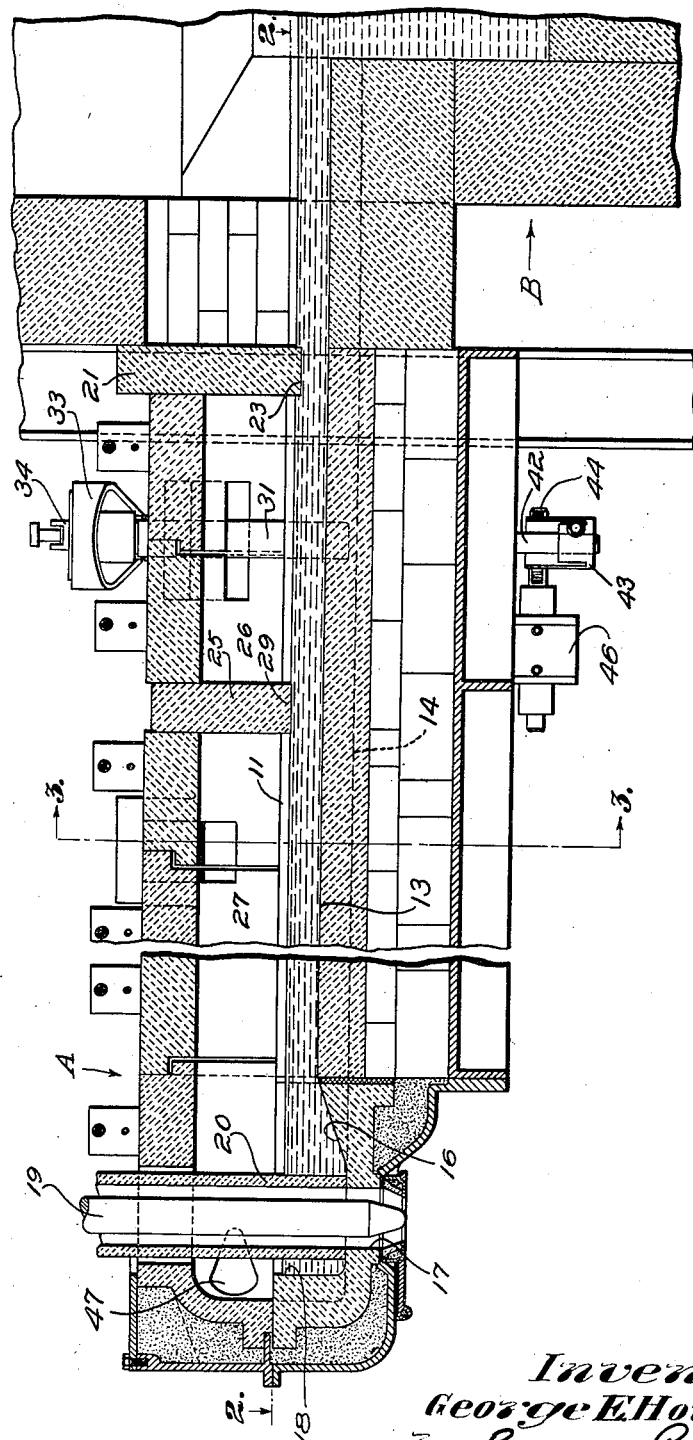
Fig. I.
Witness:
W. L. Thayer
Inventor;
George E. Howard
by Brown & Parlow
Attorneys

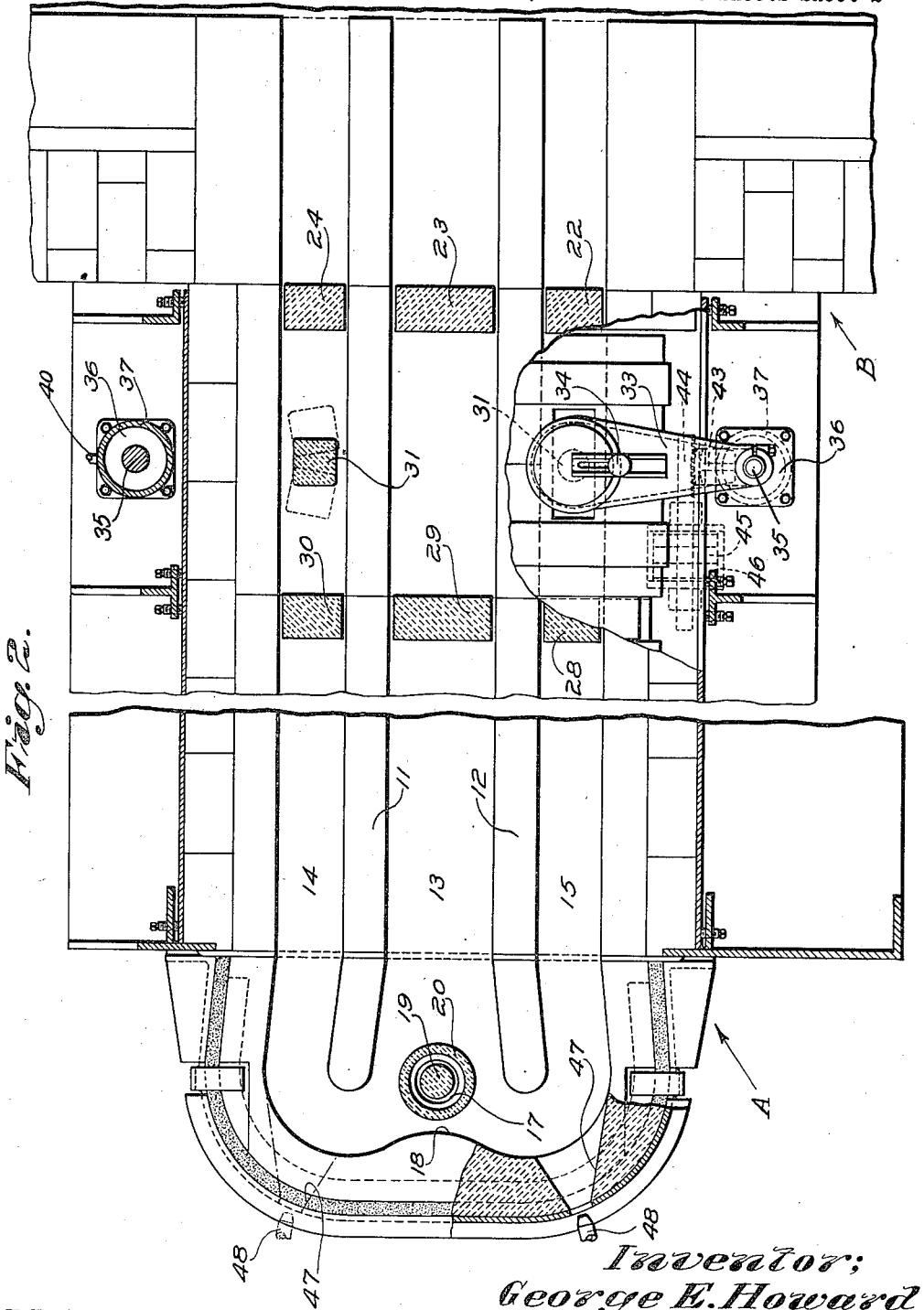

Jan. 5, 1937. G. E. HOWARD 2,067,142
APPARATUS FOR AND METHOD OF DELIVERING MOLTEN GLASS
Filed Oct. 18, 1934 6 Sheets-Sheet 3
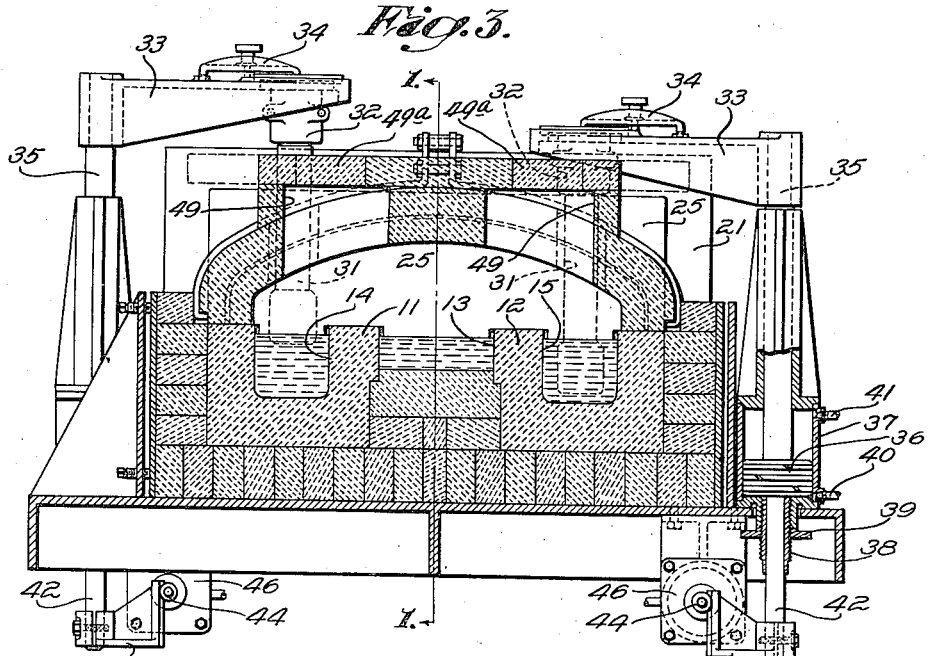
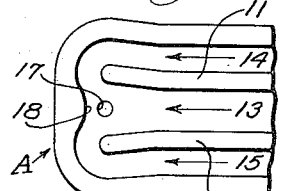
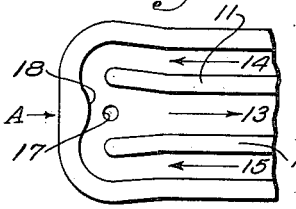
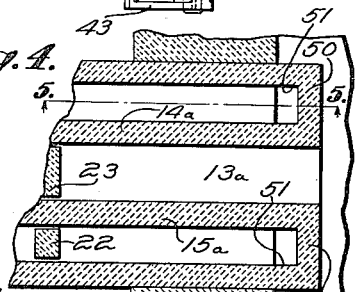
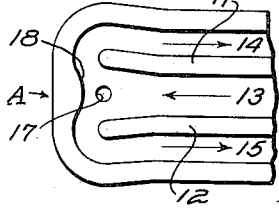
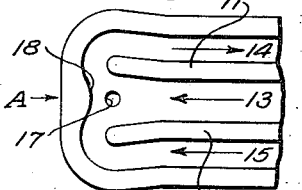
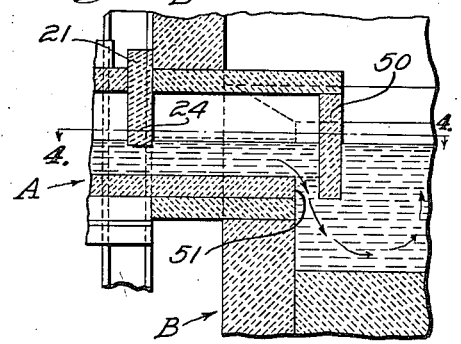
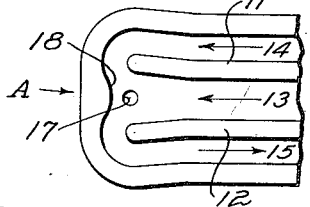
Witness:
W. B. Thayer.
Inventor:
George E. Howard
by Bunn & Parlow
Attorneys

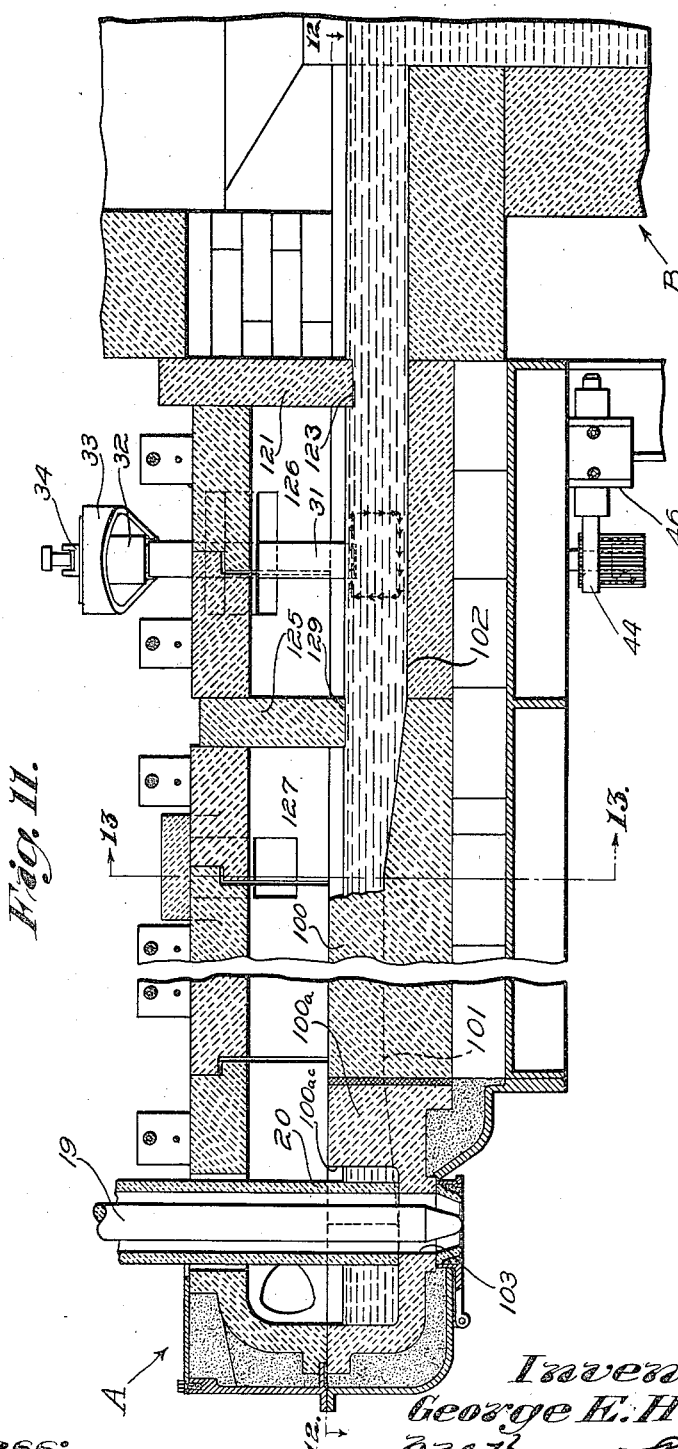

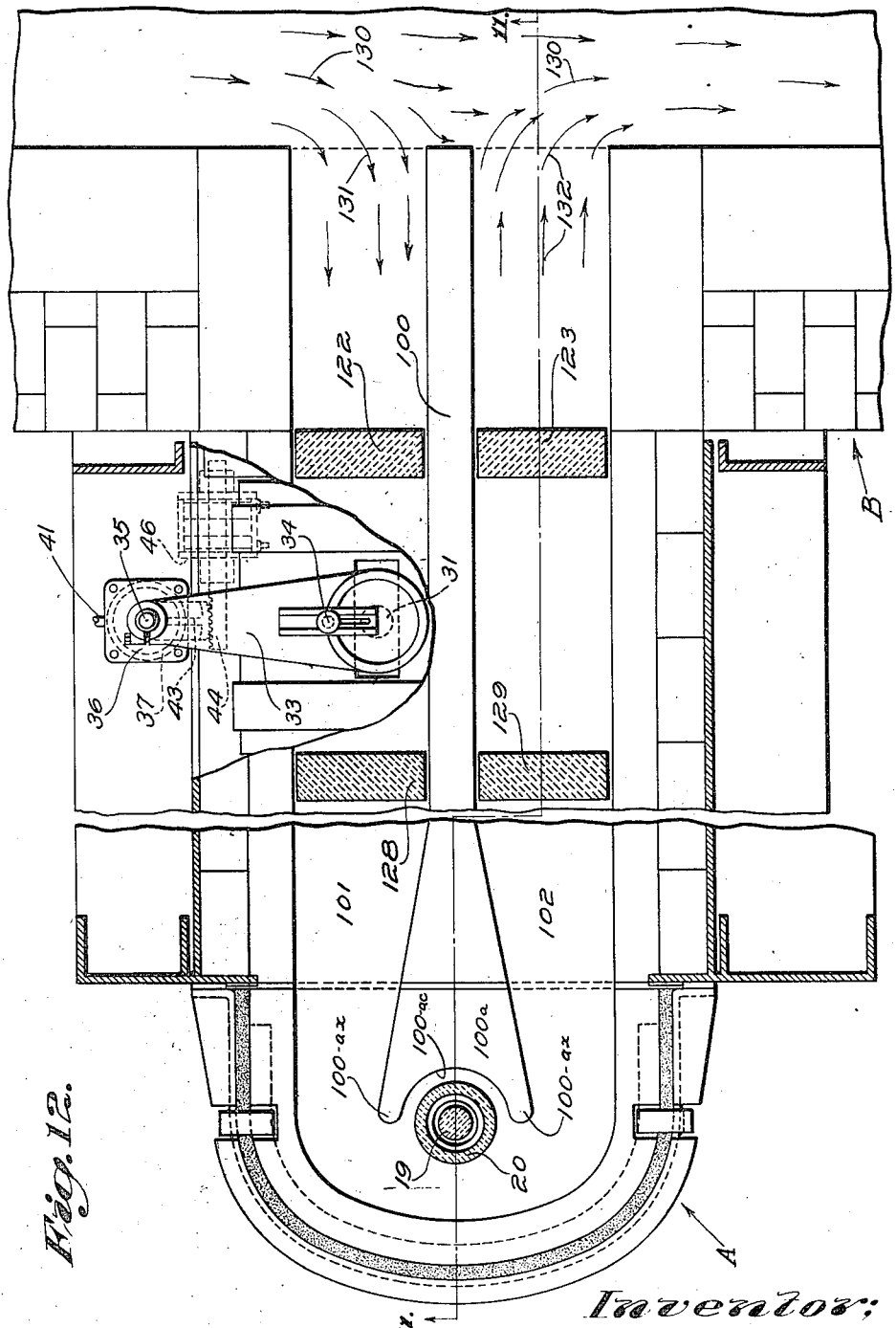

Jan. 5, 1937.　　　　G. E. HOWARD　　　　2,067,142
APPARATUS FOR AND METHOD OF DELIVERING MOLTEN GLASS
Filed Oct. 18, 1934　　　6 Sheets-Sheet 6
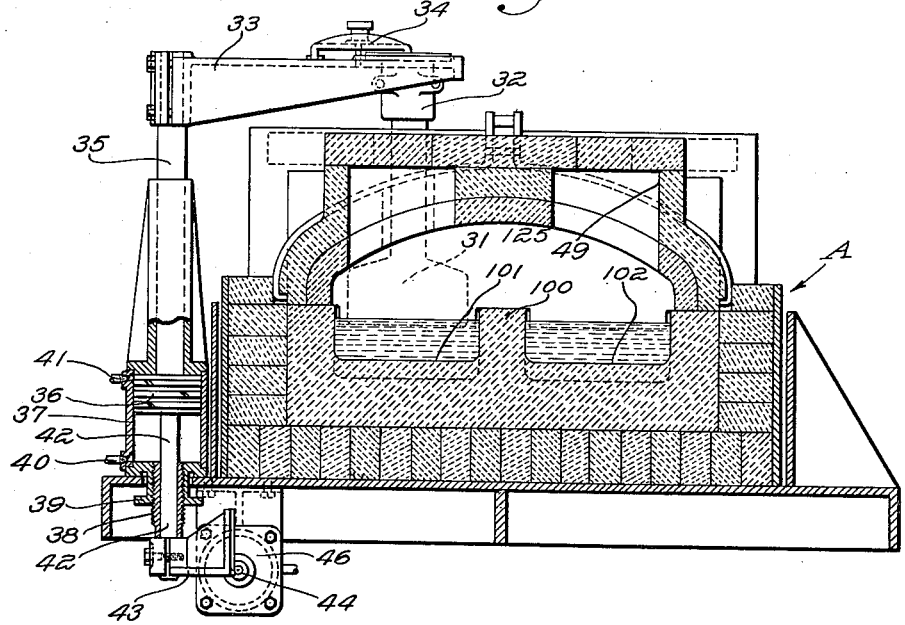
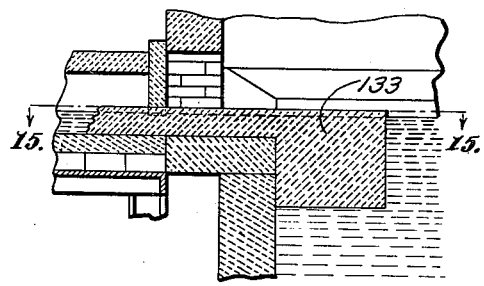 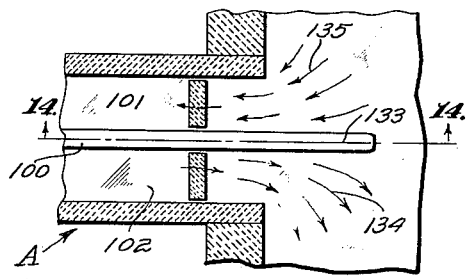
Witness:
W. B. Thayer.
Inventor:
George E. Howard
by Brown & Barlow
Attorneys

UNITED STATES PATENT OFFICE 2,067,142

APPARATUS FOR AND METHOD OF DELIVERING MOLTEN GLASS

George E. Howard, Butler, Pa., assignor to Hartford-Empire Company, Hartford, Conn., a corporation of Delaware Application October 18, 1934, Serial No. 748,807

11 Claims. (Cl. 49—56)

This invention relates to improvements in apparatus for and methods of delivering molten glass from a melting tank or like source of supply to the molds of a glassware forming machine.

It is usual in order to deliver molten glass from a melting tank to the molds of a glassware forming machine to provide the tank with a substantially horizontal extension or forehearth having a glass flow channel closed at its outer end and provided with a glass delivery outlet in its bottom adjacent to its outer end. The outer end portion of this channel thus constitutes a glass delivery or feed chamber.

In actual practice, flow of glass from the tank to the tank extension or forehearth is sufficient to maintain the amount of glass in the glass flow channel and feed chamber substantially constant irrespective of changes in the rate of delivery of glass from the delivery outlet. In other words, the level of the body of glass by which the delivery outlet of the feed chamber is submerged will be substantially the same, both when the output of glass from the delivery outlet is at a maximum, as when glassware of the largest size that can be made on the associate forming machine is being manufactured, and when there is no output of glass from the outlet, as when the outlet has been closed temporarily. The rate of flow of glass from the tank along the channel to the outlet thus will vary from a maximum rapidity when the output is at a maximum to approximately zero when the delivery outlet has been closed. In order to permit the maximum output, when required, without lowering the level of the glass in the feed chamber, it is usual to so construct the tank extension or forehearth and so connect it with the tank that a substantial depth of glass will be maintained continuously in the flow channel and feed chamber.

The temperature of the glass in the tank at the intake end of the forehearth channel is substantially constant and, generally speaking, is higher than that required at the delivery outlet at any time. On the other hand, glass of a higher temperature at the delivery outlet is required for small articles of glassware than for larger articles. The range of proper temperatures in the glass at the outlet may be as much as 400° F., depending upon the range of sizes of ware to be made from glass delivered from that outlet.

Since the rate of travel of glass from the tank along the forehearth channel to the outlet is relatively rapid when the output at the outlet is high, it is clear that in the operation of a forehearth such as above referred to, the time available for getting the glass from a higher tank temperature at the intake end of the flow channel to a lower proper temperature at the delivery outlet decreases as the amount of temperature reduction to be effected increases. Therefore, if the tank extension or forehearth is constructed and equipped with temperature regulating mechanism of such character that heat will be radiated and otherwise dissipated from the glass passing to the outlet sufficiently to effect a relatively large reduction of temperature in a minimum of time, as when the output is high and articles of glassware of a large size are being made, it is obvious that an increase of time, as when the output is lowered for the manufacture of articles of glassware of a smaller size, will tend to cause a still greater reduction of temperature in the glass by the time it reaches the outlet, although a less reduction of temperature is required.

In an attempt to compensate for this undesirable condition, it is usual in actual practice to increase substantially the heat applied locally to the glass in the forehearth, as by turning up a burner or burners, the amount of such increase varying according to the change of glass output that has been made. This not only necessitates relatively great fuel consumption but also tends to increase the differential between the temperatures of the upper and lower strata of glass passing toward the outlet. Thus, if the reduction of output and consequent decrease in the rate of travel of the glass toward the outlet are relatively great, the lower layers of glass in the flow channel become contaminated by their contact with the refractory walls of the forehearth channel and may cease to move toward the outlet with the slowly moving upper layers of glass. Later, when the output has been increased for the manufacture of larger articles of glassware, with a consequent increase in the rate of flow of glass in the forehearth channel, portions of the contaminated glass at the bottom of the flow channel may be entrained with the more rapidly moving upper layers of glass and cause defects in and loss of ware made from the glass delivered from the outlet.

Furthermore, since glass is a relatively poor conductor of heat, a relatively long temperature adjusting and stabilizing period is required in the operation of glass delivery apparatus now in general use whenever any substantial change in temperature at the outlet is to be effected, as when a substantial change is to be made in the size of the ware to be made. During such period, the glass delivered from the outlet is unsuitable for manufacture into glassware of the particular size required. Likewise, when the delivery of glass from the outlet has been stopped for any substantial period of time for any reason, resumption of delivery of glass from the outlet at a temperature that renders it appropriate for manufacture into glassware of any particular size can be effected only after a temperature regulating and stabilizing period of substantial duration.

Difficulties, such as those above pointed out as being incident to the operation of glass delivery apparatus now in general use, would likewise be present to a greater or less degree in the operation of such proposed glass delivering forehearths or tank extensions as differ from those in use in the character and extent of the operating adjustments provided for regulably controlling the radiation of heat from the surface of the glass passing toward the outlet without any change in the area of that surface and/or for regulably controlling the heat applied to the surface of the glass passing toward or above the outlet.

An object of the present invention is to provide glass delivering apparatus and a method of delivering molten glass which will make provision for changes of output of glass from the delivery outlet and changes of temperature of the glass at the outlet, as required for the feeding of glass in charges suitable for manufacture into articles of glassware of sizes that may differ within a wide range without such changes being attended by difficulties such as have been pointed out herein as being incident to the operation of devices now in general use.

A further object of the invention is to provide a glass delivery apparatus which will afford facilities for utilizing the temperature of the glass entering the delivery apparatus as the main factor in controlling the temperature of the glass at the feed outlet for all different required conditions of temperature and output of glass at the feed outlet.

A further object of the invention is to provide a glass delivery apparatus having facilities for varying the effective radiation surface of the glass between the source of supply in the tank and the outlet and moving toward the outlet whenever it is desired to change the output of glass from the outlet, so that the reduction in temperature of the glass passing from the tank to the outlet will be decreased when the output of glass at the outlet has been decreased and increased when the output has been increased.

A further object of the invention is to provide a glass delivering apparatus having facilities for causing movement of a stream of glass of relatively large area in cross section and having a relatively large heat radiating surface from the tank to the delivery end of the apparatus when the output of glass from the outlet is relatively large and the temperature of the glass at the outlet is to be relatively low and for causing a more rapid movement to the delivery end of the apparatus of a stream of glass of less area in cross section and having a smaller area of heat radiating surface when the output is less and the temperature of the delivered glass is to be higher.

A further object of the invention is to provide for circulation of glass from the tank to the delivery end of the glass delivering apparatus and back into the tank whenever the required output from the outlet of the delivery apparatus is less than the maximum possible inflow from the tank to the delivery apparatus, thereby precluding stagnation of glass in the delivery apparatus during periods of low output or shutdown, and tending to maintain the glass in the delivery apparatus in a satisfactory condition and at a satisfactory temperature at all times.

A further object of the invention is the provision of glass delivering apparatus having facilities for causing circulatory movement of glass from a supply tank to the delivery end portion of such apparatus and back to the tank and for varying the rate of such movement of glass from the tank to an outlet in said delivery end portion to regulably predetermine the temperature of the glass at the outlet in accordance with the output of glass therefrom at any given time.

A still further object of the invention is to provide a glass delivery apparatus that will function in such manner as to cause and/or take advantage of circulatory currents of glass in the supply tank adjacent to the intake end of the delivery apparatus, whereby to promote homogeneity and assure desirable temperature condition of the glass entering the delivery apparatus.

A still further object of the invention is to provide a glass delivery apparatus having improved means for directing flow of glass to the outlet of such apparatus so as to aid in obtaining desirable homogeneity of the delivered glass.

Other objects and advantages of the invention will hereinafter be pointed out or will become apparent from the description of illustrative practical embodiments of the invention as shown in the accompanying drawings, in which Figure 1 is a longitudinal vertical section through one form of glass delivery apparatus embodying the invention as applied to a tank furnace, a fragmentary portion of which is shown, the view being substantially along the line 1—1 of Fig. 3;

Fig. 2 is a horizontal sectional view of the glass delivery structure of Fig. 1 with a portion shown in plan, the view being substantially along the line 2—2 of Fig. 1, except for the portion shown in plan;

Fig. 3 is a transverse vertical section substantially along the line 3—3 of Fig. 1;

Fig. 4 is a fragmentary horizontal sectional view of a modified form of structure at the juncture of the associate tank and glass delivery apparatus of the general type shown in the preceding views;

Fig. 5 is a section substantially along the line 5—5 of Fig. 4;

Figs. 6 to 10 inclusive are similar fragmentary plan views to illustrate different modes of use of glass delivery apparatus of the general form shown in the preceding views;

Fig. 11 is a longitudinal vertical sectional view similar to Fig. 1 but showing a structural embodiment of the invention in which the forehearth channel is divided longitudinally into but two branches or divisions, the view being the line 11—11 of Fig. 12;

Fig. 12 is a horizontal sectional view of the structure shown in Fig. 11, the view being substantially along the line 12—12 of Fig. 11 except for a fragmentary portion that is shown in plan;

Fig. 13 is a transverse vertical section along the line 13—13 of Fig. 11;

Fig. 14 is a fragmentary longitudinal vertical sectional view of a modified form of structure at the juncture of the associate tank and the two-divisional channel of the general form of apparatus shown in Figs. 11 to 13, inclusive, the view being substantially along the line 14—14 of Fig. 15; and Fig. 15 is a fragmentary horizontal sectional view along the line 15—15 of Fig. 14.

In carrying out the invention, I may provide a forehearth or tank extension structure, generally indicated at A, and suitably connect it with a tank furnace B, so that glass from the tank furnace tends to flow by gravity and head pressure into the channel of the forehearth structure.

The bottom and side walls of the forehearth structure A may be constructed of any suitable known materials and in any suitable known manner. The walls of the forehearth structure may include or be provided with heat insulating material, and may be supported appurtenant to and/or connected with the tank structure in any suitable known way.

In glass delivery apparatus of the general form shown in Figs. 1 to 10, inclusive, the glass receiving channel of the forehearth structure A is divided longitudinally from its intake end nearly to its outer end, as by the longitudinal division walls 11 and 12 (Figs. 2 and 3), into a middle branch 13 and a pair of similar side branches 14 and 15, respectively.

The bottom of the middle branch 13 may be higher than the bottom of the side branches 14 and 15 from the intake end thereof nearly to the outer end of the middle branch, as clearly shown in Fig. 1, the remaining or outer end portion of the bottom of the middle branch preferably being inclined downwardly, as indicated at 16 in Fig. 1, to the level X of the bottoms of the side branches.

With this arrangement, the depth of glass in the middle branch is less than that in each of the side branches when the surfaces of the streams of glass in these three branches are at the same level, which may correspond with the level of the glass in the supply tank.

Also, with this arrangement, glass entering the middle branch from the supply tank will be taken from a higher level than the lower layers of the glass entering the side branches, and thus may have an average temperature slightly higher than that of the glass entering each of the side branches.

The longitudinally extending division walls 11 and 12 may have their outer end portions formed to diverge slightly, as best seen in Fig. 2. The space between the divergent outer end portions of the division walls 11 and 12 and extending from the extremities of these division walls to the front wall of the forehearth structure may be said to constitute the glass delivery or feed chamber of the forehearth structure, and the bottom of this space may be provided with a vertical outlet, such as indicated at 17 in Figs. 1 and 2. This outlet preferably is located approximately midway between the extremities of the division walls 11 and 12 when the latter are located as shown.

Glass from the branches 14 and 15 may pass around the extremities of the division walls 11 and 12 into this delivery or feed chamber. In order to direct glass from either of the side branches 14 and 15 directly over the outlet, the middle portion of the front wall of the forehearth channel may have a rearwardly projecting curved glass contacting surface, as indicated at 18 in Fig. 2.

The feeding of glass from the feed or delivery chamber through the outlet 17 may be regulated and controlled by any suitable means, as by mechanism including a reciprocable vertical plunger 19 and a surrounding refractory sleeve 20 (Figs. 1 and 2), the use of which is well known in the art.

The space above the glass in the forehearth structure may be separated from the space above the glass in the supply tank, as by the use of a transverse refractory plate or slab 21 (Figs. 1 and 3) having depending spaced portions 22, 23 and 24 reaching to or dipping slightly below the surfaces of the streams of glass in the respective branches of the glass flow channel, as shown in Fig. 2.

The depending portions 22, 23, and 24 of the transverse refractory member 21 thus may serve to skim the glass entering the branches of the forehearth channel.

A transverse refractory plate or slab 25 (Figs. 1 and 3) preferably also is provided at a substantial distance in advance of the transverse member 21 for separating the space above the streams of glass in the respective branches of the channel into a rear transverse division or chamber 26 and a front division or chamber 27 (Fig. 1). The transverse refractory member 25 has depending projections 28, 29, and 30, respectively, (Fig. 2) which may reach to or dip slightly below the surfaces of the streams of glass in the respective branches of the glass conducting channel of the forehearth.

The chamber 26 has a cover wall provided with suitable openings above the lateral branches 14 and 15 of the forehearth channel to accommodate substantially vertical refractory impellers 31, which may be paddles or sweeps adapted to be oscillated with generally fore-and-aft movements.

The impellers 31 may have upper end portions supported by removable chucks or sleeves 32 which in turn may have head portions removably secured by clamping devices 34 in vertical slots in oscillatory horizontal arms 33.

The arms 33 are supported on vertical rods 35 which may constitute extensions of the rods of pistons 36 in vertical cylinders 37. When the piston 36 in each cylinder 37 is raised, as by the pressure of air admitted to its lower end portion, the impeller 31 with which that piston is connected will be raised until its lower edge is but very slightly immersed in the stream of glass in the underlying branch of the forehearth channel, as to the position shown for the left hand impeller 31 in Fig. 3. When each piston 36 is at the lower end of its stroke in its cylinder, as in the position shown for the right hand piston 36 in Fig. 3, the impeller 31 with which that piston is connected will be lowered until it depends to a substantial distance below the surface of the glass in the underlying branch of the forehearth channel, as to the position shown for the right hand impeller 31 in Fig. 3.

The depth of dip of each impeller into the underlying stream of glass may be regulated within limits, as by an adjustable stop at the lower end of the operating cylinder, such a stop being shown in the lower right hand corner of Fig. 3 as a screw threaded sleeve 38, and being adjustable vertically by a hand wheel 39.

The reciprocation of each of the impellers vertically to raise and lower it in the underlying glass stream may be effected by periodically admitting air under pressure to each of the opposite ends of the operating cylinder, as through pipes such as indicated at 40 and 41 for the right hand cylinder 37 in Fig. 3.

It of course will be understood that the pressure fluid will be permitted to exhaust from each end of the cylinder 36 when pressure is being admitted to the opposite end thereof. The control of the application and exhaust of fluid under pressure to and from the respective ends of each of the cylinders 37 may be obtained by the use of any suitable timing mechanism, such as the well-known Hartford I. S. timer.

For oscillating each of the respective impellers fore-and-aft in timed relation with its vertical movements, mechanism substantially as follows may be employed.

The pistons 36 in the respective vertical cylinders 37 may be provided with depending or lower vertical rods, such as that indicated at 42 (Fig. 3) in addition to the upper rods 35. These lower rods may carry sector shaped gears 43, the teeth of which are engaged by horizontal rack bars 44. The rack bars 44 may constitute extensions of the rods of pistons, such as that which is shown in dotted lines at 45 in Fig. 2, such pistons being reciprocable in horizontal cylinders 46. The reciprocation of the pistons 45 in the cylinders 46 may be effected by admitting and exhausting fluid under pressure to and from the opposite ends of the cylinders 46 under the control of the timer by which the operations of the pistons 36 in the vertical cylinders 37 are controlled.

With the construction described, it is obvious that in order to impel glass forwardly in the side branches of the forehearth channel, it only is necessary to time the forward oscillatory movements of the impellers so as to coincide with the periods of dip of the impellers into the glass of the underlying streams and to time the return or rearward strokes of the impellers to coincide with the periods of lift of the impellers. To reverse the direction in which glass will be impelled by the action of the impellers 31, the periods of rearward oscillatory movements of the impellers are timed to coincide with the periods of dip of such impellers into the glass.

Of course, provision may be made by the use of a timer such as described so that each of the respective impellers will be controlled independently of the other impeller, so that one impeller may be employed to impel glass forwardly in one of the side branches of the forehearth channel while the other impeller is employed to impel glass rearwardly in the other side branch of the forehearth channel, and vice versa.

The depending projections 28, 29, and 30 of the intermediate transverse refractory member 25 serve to damp or break up any waves or surges that might otherwise be transmitted to the glass in the delivery or feed chamber of the forehearth by reason of the intermittent glass impelling operations of the impellers 31.

Means may be provided for applying heat to the glass in the delivery or feed chamber and while passing thereto in the chamber 27 of the forehearth structure. To this end, the front wall of the forehearth structure thus may be provided with openings, such as indicated at 47 (Fig. 2) adapted to accommodate burners 48 by which a combustible fuel mixture may be projected into the space above the glass at the juncture of each of the side branches of the forehearth channel with the delivery or feed chamber at the outer end of the middle branch.

When the burners 48 are employed, provision may be made for venting the waste products of combustion and gases from the space above the glass in the forward chamber 27 of the forehearth structure. For this purpose, a portion of the top wall of the chamber 27 may be so constructed as to provide outlet chambers 49 (Fig. 3), each having a top including a removable block 49a. When the blocks 49a are removed, the openings left constitute vents or chimneys for products of combustion and waste gases from the burners 48.

The structure that has been described may be operated in different ways in accordance with the invention in order to meet different service requirements. Some of the ways in which such structure may be operated are illustrated in Figs. 6 to 10 inclusive.

Fig. 6 shows a mode of operation which may be followed when the output of glass at the outlet 17 is at a maximum, as when charges of glass of the largest size obtainable are required for the manufacture of articles of glassware of the largest size to be made by the use of the associate forming machine. When this condition exists, the impellers 31 may be maintained inactive at the upper ends of their vertical strokes, and glass from the supply tank may enter all three of the branches of the respective channels and flow along these branches, as indicated by the arrows in Fig. 6, to the delivery or feed chamber at the outer ends of such branches. The burners may or may not be employed at this time, depending on whether or not their use is required to prevent inequalities of temperature in the different streams of glass passing to the feed chamber from the respective branches of the forehearth channel.

Instead of the impellers being retained inactive during this mode of operation and the pull through the glass in the feed chamber being relied on to control the rate of movement of the streams of glass along the respective channels to the feed chamber, one or both of the impellers may be operated at the required speed and to impel glass in the direction required to aid or oppose the pull at the outlet as an effective means for controlling the rate of flow and the temperature of the glass passing to the feed chamber. If desired, an impeller or an adjustable flow regulating gate may be provided for the middle branch of the forehearth channel.

In the mode of operation just described, as well as in other modes of operation of apparatus embodying the invention, the area of heat radiating surface of the glass passing to the outlet and the rate of travel of such glass are selected in view of the temperature of the glass at the intake end of the forehearth channel and the temperature that is desired for the glass at the outlet, so that the reduction of temperature of the glass during its travel to the outlet will be just sufficient to provide the desired temperature at that point. Heat from the burners, if used at all, may be primarily for stabilization of temperature of the glass in the feed chamber or to promote uniformity of temperature throughout all the glass in the feed chamber.

In the mode of operation illustrated in Fig. 7, the glass to be fed from the outlet is flowing from the tank along the middle channel to the delivery or feed chamber and excess glass is being returned to the tank along the side branches of the forehearth channel, all as indicated by the arrows. For this purpose, the impellers may be operated so as to impel glass rearwardly in the side branches of the forehearth channel at a rate which may be adjusted to meet particular requirements at any given time.

It will be observed that the middle branch of the forehearth channel not only may be relatively shallow, as shown, but it is protected against heat loss at its sides by the side branches of the glass conducting channel of the forehearth. The reduction of temperature of the glass supplied to the feed chamber by way of the middle channel therefore may be relatively slight and this mode of operation therefore is well adapted for the feeding of glass at a relatively high temperature and in relatively small charges appropriate for manufacture into small articles of glassware. This mode of operation also may be used to advantage during shut-down periods, as conditions within the forehearth thus may be maintained appropriate to permit prompt resumption of glass feeding operations when desired.

For the manufacture of articles of glassware of a range of sizes between the large sizes referred to in the description of the mode of operation illustrated in Fig. 6 and the small sizes referred to in the description of the mode of operation illustrated in Fig. 7, the glass to be fed may be conducted to the delivery or feed chamber by way of the side branches of the forehearth channel, excess glass being returned to the tank through the middle channel, as indicated by the arrows in Fig. 8. In this mode of operation, the impellers 31 may be operated to impel glass forwardly in the side branches of the forehearth channel at a rate which may be predetermined to meet existing conditions at any given time.

Figs. 9 and 10 illustrate similar modes of operation which may be employed to meet particular service conditions.

As shown in Fig. 9, glass is being supplied to the delivery or feed chamber from the middle branch and through one of the side branches and is being returned to the tank by the second side branch of the forehearth channel. This mode of operation may be effected by causing the impeller for the first side branch to impel glass forwardly, while the impeller for the second side branch may be operated to impel glass rearwardly.

The mode of operation illustrated in Fig. 10 is just the reverse of that shown in Fig. 9. Glass is being conducted to the delivery or feed chamber through the middle branch and the second side branch of the forehearth channel and is being returned to the tank through the first side branch.

In the construction shown in Figs. 1 to 3 inclusive, the respective branches of the forehearth channel are open at their inner ends so that glass may flow horizontally thereinto from the supply body in the tank, although the bottom of the middle branch is located at a somewhat higher level than the bottoms of the side branches.

In the modified form of construction shown in Figs. 4 and 5, the side branches of the forehearth channel, designated 14a and 15a, respectively, are closed at their inner ends, as by transverse end walls indicated at 50. The middle branch 13a of the forehearth channel may be left open at its inner end, as in the preceding form of construction. The side branches 14a and 15a of the forehearth channel communicate with the interior of the tank below the glass level in the latter by means of ports 51 in the bottoms of their inner end portions.

Thus, when glass is being supplied to the delivery chamber through the middle branch and is being returned to the tank through the side branches, the glass being returned will be delivered back to the tank at points farther below the surface of the supply body of glass than when the structure shown in Figs. 1 to 3, inclusive is employed. This will effect an improved homogenizing action in the glass at the intake end of the forehearth, currents being set up therein substantially as indicated by the arrows in Fig. 5.

In apparatus of the general form shown in Figs. 11 to 15, inclusive, the channel of the forehearth structure A is divided longitudinally from its intake end nearly to its outer end by a single longitudinal division wall 100 which may be located midway of the side walls of the channel, thus providing a pair of similar juxtaposed channel branches or divisions 101 and 102, respectively.

The portion of the forehearth channel at the outer ends of the branches 101 and 102 and in front of the outer end of the division wall 100 constitutes the glass delivery or feed chamber of the forehearth structure. A vertical outlet 103 may be provided in the bottom of this delivery or feed chamber. The feeding of glass from the feed or delivery chamber may be regulated and controlled by suitable means, as by mechanism including a reciprocable vertical plunger 19 and a surrounding sleeve 20, as hereinbefore has been pointed out.

Preferably the outer end portion of the division wall 100 is enlarged gradually and symmetrically in thickness toward its outer end, as indicated at 100a, Fig. 12, the extreme outer end portion of the division wall being sufficiently wide and so formed as to provide a pair of similar guard wings or baffles 100—ax at approximately opposite sides of the outlet 103 when the latter is located partially beneath a substantially semi-cylindrical open-topped recess or chamber 100—ac in the outer end of the division wall 100. The outlet 103 preferably is located nearer to the re-entrant concavely curved front face of the division wall than to the outer end or front wall of the forehearth channel. Relatively hot glass at the inner side of either the branch 101 or the branch 102 thus cannot pass directly to the outlet but instead will be guided laterally by the outwardly turned adjacent side face of the portion 100—a of the division wall as such glass passes into the glass delivery chamber at the outer end of the forehearth channel. Consequently, glass from either of the channel branches 101 or 102 will be mixed and homogenized in passing around the adjacent guard wing or baffle 100—ax toward the outlet 103.

The space above the glass in the forehearth channel may be separated from the space above the glass in the supply tank by a transverse refractory plate or slab 121, Fig. 11, having depending spaced portions 122 and 123, Fig. 12, reaching to or dipping slightly below the surfaces of the streams of glass in the channel branches 101 and 102, as shown for the part 123 in Fig. 11.

A transverse refractory plate or slab 125, Fig. 11, has spaced depending portions 128 and 129, Fig. 12, depending to the surface of the streams of glass in the channel branches, as shown for the part 129 in Fig. 11. The plate or slab 125 is located a substantial distance in advance of the transverse member 121 and co-operates with the latter and with the walls of the cover structure of the forehearth channel to separate the space above the glass streams in the latter into a rear transverse division or chamber 126 and a front transverse division or chamber 127 (Fig. 11).

The chamber 126 has its cover structure provided with suitable openings above the branches 101 and 102 of the forehearth channel to accommodate substantially vertical refractory impellers. Such impellers and their operating and supporting mechanisms may be substantially the same as those which have hereinbefore been described as applicable to the form of apparatus shown in Figs. 1 to 3, inclusive. The same reference characters designate the same or like parts throughout the several views of the drawings and it therefore is believed to be unnecessary to repeat the description thereof. It may be noted, however, that I may provide an impeller 31 in contact with the glass in but one of the two branches of the forehearth channel, as, for example, for the glass in the branch 101 as shown in Figs. 11, 12, and 13.

Apparatus of the particular form shown in Figs. 11, 12, and 13 has structural features which are substantially the same as corresponding features of the form of apparatus shown in Figs. 1 to 3 inclusive. The same reference characters indicate the substantial identity of generally corresponding parts of the two forms of apparatus.

The operation of the apparatus of the two-divisional channel form of construction may be varied at different times to meet different service conditions. When only one of the branches or divisions of the forehearth channel is provided with an impeller 31, as shown in Figs. 12 and 13, and the articles of glassware to be produced from charges of glass fed through the outlet are within a range of relatively small sizes, the impeller 31 may be actuated to cause circulation of glass from the tank along the branch 101 of the forehearth channel to the delivery end or feed chamber portion of that channel and thence back to the tank by way of the division 102 of the channel. The loss of heat from the glass as it passes from the tank to the outlet may be controlled within a considerable range when glass is circulated in this manner by regulable control of the rate of circulatory movement of the glass. This in turn will permit predetermination of the temperature of the glass issuing from the outlet which temperature may be varied according to changes in the output. This mode of operation also is well adapted to maintain a balanced or normal working condition in the forehearth during periods of cessation of discharge of glass from the outlet, as when the feeder has been shut down temporarily for any purpose.

It is within the contemplation of the invention that a structural embodiment thereof may be connected with the supply tank so as to take advantage of circulatory currents of glass in the supply tank. For example, it is within the purview of the invention that the supply tank shall be equipped with suitable means, such as disclosed in my Patent 1,919,668, granted July 4, 1933, for causing transverse currents of glass at the delivery end of the supply tank, such for example as those indicated by the arrows 130 in Fig. 12. The forehearth structure may be associated with the delivery end of this tank so that the transverse currents of glass in the tank move past the intake end of the delivery branch or division of the forehearth channel before passing the return branch or division of such forehearth channel. Thus, glass that has been circulated in the tank will enter the delivery branch of the forehearth channel, as indicated by the arrows 131 in Fig. 12. The return stream of glass in the other branch or division of the forehearth channel will return to the supply tank as indicated by the arrows 132, Fig. 12, and thus will be entrained with the transverse currents 130 in the tank so that the glass that has circulated through the forehearth channel will be caused to circulate in and become commingled with the glass of the supply tank before such glass can again enter the delivery branch or division of the forehearth channel. This makes for uniformity of temperature and condition of the glass entering the forehearth channel.

Should the supply tank not be provided with any positive means for causing a transverse circulation of glass therein, then the longitudinal median division wall 100 of the two-divisional channel form of forehearth may be extended, as indicated at 133 in Figs. 14 and 15, to project into the glass of the supply tank a distance sufficiently far to assure that the glass leaving the forehearth channel by way of the return branch thereof will be diverted into the body of the glass in the supply tank, as indicated by the arrows 134 in Fig. 15, before being permitted to pass into the delivery branch of the forehearth channel, as with the currents of glass indicated by the arrows 135 in Fig. 15.

When a range of larger sizes of glassware is to be manufactured, the impeller may be maintained inactive and in its raised position and both branches of the forehearth channel may be used as delivery branches so that glass from the supply tank will pass along both branches to the delivery end portion or feed chamber at the outer end of the forehearth channel. With this arrangement, the loss of heat from the glass passing from the supply tank to the outlet will be greater than when glass is passing thereto by way of only one of the branches. Such loss of heat also may be greater because of the lessening of the rate of flow movement of glass during its travel from the supply tank to the outlet. The charges for the larger articles of glassware thus may be fed at a lower temperature than the charges for the smaller articles of glassware, and such regulation and control of temperature may be effected without involving substantial changes in any means with which the forehearth may be equipped for applying heat to the glass therein. In other words, the heat from the burners may be only such as to stabilize conditions within the forehearth and the control of temperature may be effected by regulable control of the rate of flow of glass from the supply tank to the outlet and of the area of heat radiating surface of the glass passing to the outlet.

By use of the invention, glass of the temperature required and in the volume required may be fed from the outlet for the production of charges appropriate for manufacture into articles of glassware of any size within a wide range and the rate of output and the temperature of the glass being fed may be changed to meet changed service conditions without encountering the difficulties which have been pointed out herein as being incident to like changes when glass delivering apparatus now in general use is employed.

It is to be understood that many changes in the method of the invention and in details of structure embodying the invention from those herein particularly pointed out or described may be made without departing from the spirit and scope of such invention.

I claim:

1. The method of delivering molten glass from a melting tank or like source of supply, comprising flowing glass along a flow channel from the source of supply to a feed chamber having an outlet adapted to be submerged by the glass therein, and altering the heat radiating surface of the glass passing to the feed chamber in accordance with a change to be effected in the output of glass from said outlet.

2. The method of delivering molten glass from a melting tank or like source of supply, comprising flowing glass in a stream along a flow channel of a forehearth from the source of supply to a feed chamber having an outlet adapted to be submerged by the glass therein, and altering the heat radiating surface of the glass stream passing to the feed chamber and the rate of travel of the glass of such stream in accordance with a change in the output of glass from said outlet.

3. The method of delivering molten glass from a melting tank or like source of supply, comprising flowing glass from the source of supply in a stream to a feed chamber having a bottom discharge outlet, maintaining said stream at a given width when the glass discharging from the outlet is being separated into charges appropriate for the manufacture of articles of glassware of a given range of sizes, and altering the width of said stream of glass to increase the heat radiating surface of said stream when the glass discharging from the outlet is to be separated into charges appropriate for manufacture into articles of glassware of a range of larger sizes and to decrease the heat radiating surface of said stream when the glass discharging from the outlet is to be separated into charges appropriate for manufacture into articles of glassware of range of smaller sizes.

4. The method of delivering molten glass from a melting tank or like source of supply to a feed chamber having a discharge outlet adapted to be submerged by the glass therein, which comprises flowing glass from the source of supply to the feed chamber in a stream of relatively great width when the temperature of the glass discharging from the outlet is to be relatively low and flowing glass from the source of supply to the feed chamber in a stream of less width when the temperature of the glass discharging from the outlet is to be higher.

5. The method of delivering molten glass from a melting tank or like source of supply which comprises, providing a feed chamber having a bottom discharge outlet at a place adjacent to said source of supply, and flowing glass from the source of supply to said feed chamber in a stream of a width that is selected according to the reduction of temperature to be effected in glass passing from said source of supply to said feed chamber during any given period of time and is changed when the amount of said reduction of temperature is to be changed.

6. The method of delivering molten glass from a melting tank or like source of supply which comprises, providing a feed chamber having a bottom discharge outlet at a place adjacent to said source of supply, and flowing glass from the source of supply to said feed chamber in a stream having a heat radiating surface that has been predetermined with relation to the temperature desired for the glass at the outlet at any particular time, and altering the heat radiating surface of the stream of glass flowing to the feed chamber when a different temperature is desired for the glass at said outlet.

7. The method of delivering molten glass from a melting tank or like source of supply which comprises, providing a feed chamber having a bottom discharge outlet and a glass flow channel having a plurality of juxtaposed branches all communicating at their outer ends with the feed chamber and communicating at their inner ends with the interior of the tank below the level of the glass in the latter, predetermining the direction of flow of glass between the tank and the feed chamber in said respective branches to predetermine the temperature of the glass at the outlet at any given time, and altering the flow in at least one of said branches to effect a change in the temperature of the glass at the outlet.

8. Glass delivery apparatus comprising a forehearth having a channel communicating at its inner end with the interior of a melting tank and provided at its outer end with a glass feed chamber having a discharge outlet in its bottom, means dividing the channel of the forehearth to provide two longitudinally extending branches having separate places of communication at their inner ends with a supply body of glass in the tank and both communicating at their outer ends with said feed chamber, and baffles at the junctures of said branches and said feed chamber, flanking said outlet and in spaced relation therewith for causing a stream of glass from either of said branches to enter said feed chamber at a side and to the front of said outlet.

9. Glass delivery apparatus comprising a forehearth having a channel communicating at its inner end with the interior of a melting tank and provided at its outer end with a glass feed chamber having a discharge outlet in its bottom, means dividing the flow channel of the forehearth to provide two longitudinally extending branches having separate places of communication at their inner ends with a supply body of glass in the tank and both communicating at their outer ends with said feed chamber, means for causing circulation of glass from the tank through one of the branches of said forehearth channel to the feed chamber and return of glass from the feed chamber along the other of said branches to the tank, and means at the juncture of said branches of the forehearth channel and the tank for causing the return glass from the forehearth channel to be circulated in the supply body of glass in the tank before being permitted to enter a branch of the forehearth channel.

10. Glass delivery apparatus, comprising a forehearth having a channel communicating at its inner end with the interior of a melting tank and provided at its outer end with a glass feed chamber having a discharge outlet in its bottom, means dividing the flow channel of the forehearth into a pair of longitudinally extending branches having separate places of communication at their inner ends with the supply of glass in the tank and both communicating at their outer ends with said feed chamber, said forehearth channel communicating with said tank so that transverse currents in the supply body of glass in the tank pass across the inner end of one of said branches of the forehearth before passing the inner end of the second of said forehearth branches, and means for causing circulatory movement of glass through said first branch of the forehearth channel to the delivery chamber and thence back to the tank through the second branch of said forehearth channel.

11. Glass delivery apparatus, comprising a forehearth having a channel communicating at its inner end with the interior of a melting tank below the level of the glass in the latter and provided at its outer end with a glass delivery chamber, a longitudinal wall dividing the flow channel of the forehearth into a pair of longitudinally extending branches having separate places of communication at their inner ends with a supply body of glass in the tank and both communicating at their outer ends with said feed chamber, means for causing circulatory movement of glass from the tank along one of said branches of the forehearth channel to the delivery chamber and thence back to the tank through the second branch of said forehearth channel, and an extension of said longitudinal division wall of the forehearth channel at the inner end thereof, said extension projecting into the supply body of glass in the tank a distance sufficient to divert the returned glass from the forehearth channel into such supply body of glass before permitting any portion of said returned glass to enter a branch of the forehearth channel.

GEORGE E. HOWARD.